United States Patent [19]
Jones et al.

[11] 3,748,853
[45] July 31, 1973

[54] SWIRL CAN PRIMARY COMBUSTOR

[75] Inventors: Robert E. Jones, Berea; Richard W. Niedzwiecki, Cleveland Heights, both of Ohio

[73] Assignee: The United States of America as represented by the Administrator of the National Aeronautics and Space Administration, Washington, D.C.

[22] Filed: Oct. 27, 1971

[21] Appl. No.: 192,970

[52] U.S. Cl. .......... 60/39.65, 60/39.72, 60/39.74 R, 60/39.66, 431/9, 431/173
[51] Int. Cl. ............................................. F02c 1/00
[58] Field of Search ........................ 60/39.65, 39.23, 60/39.29, 39.72, 39.74 R; 431/9, 173

[56] References Cited
UNITED STATES PATENTS

| | | | |
|---|---|---|---|
| 3,267,676 | 8/1966 | Sneeden | 60/39.65 X |
| 2,934,894 | 5/1960 | Lang | 60/39.65 X |
| 2,999,359 | 9/1961 | Murray | 60/39.65 |

Primary Examiner—Clarence R. Gordon
Attorney—N. T. Musial, John R. Manning et al.

[57] ABSTRACT

A swirl can full annulus combustor operable over a wide range of exit average temperatures is used in a high performance gas turbine engine for advanced aircraft. A large number of swirl can modules are mounted in an array in each combustor.

4 Claims, 3 Drawing Figures

PATENTED JUL 31 1973 3,748,853

INVENTORS
ROBERT E. JONES
RICHARD W. NIEDZWIECKI

BY Norman T. Musial
Gene E. Shook
ATTORNEYS

SWIRL CAN PRIMARY COMBUSTOR

STATEMENT OF GOVERNMENT OWNERSHIP

The invention described herein was made by employees of the United States Government and may be manufactured and used by or for the Government for governmental purposes without the payment of any royalties thereon or therefor.

PRIOR ART

This invention is concerned with a combustor having improved performance for use in an improved gas turbine engine. The invention is particularly directed to a full annulus swirl can primary combustor operable over a wide range of combustion average exit temperatures with high efficiency.

Certain advanced aircraft need improved engines for propulsion at high cruising speeds. Gas turbine engines of minimum weight have been proposed for take-off and acceleration to the high cruise Mach numbers of such aircraft. Problems have been encountered in these engines because present combustors operate at relatively low exit temperatures and use complicated liners to admit mixing air into the hot combustion gases.

The performance of conventional combustors decreases when they are operated at high exit average temperatures. Combustion efficiency especially decreases at high exit temperatures approaching stoichiometric temperatures. Also large amounts of combustor total airflow are required to cool the complicated liners. This limits exit temperatures because the air is not available for combustion.

Acoustic instability may be a problem at high exit temperatures in conventional combustors. Smoking problems may be encountered at the fuel-air ratios required for high exit temperatures. The complicated liner configurations required in these combustors create durability problems. Long combustor lengths result in greater liner surface areas to be cooled. The conventional combustors also utilize atomizing fuel nozzles which require high pressure fuel pump systems.

SUMMARY OF THE INVENTION

These problems have been solved by a full annulus combustor utilizing many swirl can modules. Fuel is injected into the combustor at each module. Combustion air enters each module and mixes with the fuel. The fuel-air mixture passes through a swirler and is ignited downstream. Secondary combustion air flows axially past the modules, recirculates in their wakes, and completes the combustion reaction. Essentially all of the combustion air is passed through the module array and burning zone.

Premixed fuel and air are injected into the combustor at many more locations than in a conventional combustor thereby providing a better opportunity for homogeneous mixture of fuel and air. Fuel flow is readily controlled at each module and varying amounts of fuel can be supplied to compensate for nonuniformity of air flow profiles.

OBJECTS OF THE INVENTION

It is, therefor, an object of the present invention to provide an improved primary combustor for a high performance gas turbine engine that is operable up to and beyond the stoichiometric temperature.

Another object of the invention is to maintain high combustion efficiency in a gas turbine engine combustor over a wide range of exit average temperatures.

A further object of the invention is to provide an improved combustor having a length about half that of conventional combustors.

A still further object of the invention is to reduce nitrogen oxide levels by accelerated mixing of combustion gases and additionl air.

These and other objects of the invention will be apparent from the specification which follows and from the drawing wherein like numerals are used throughout to identify like parts.

DESCRIPTION OF THE PREFERRED EMBODIMENT

Figure 1:
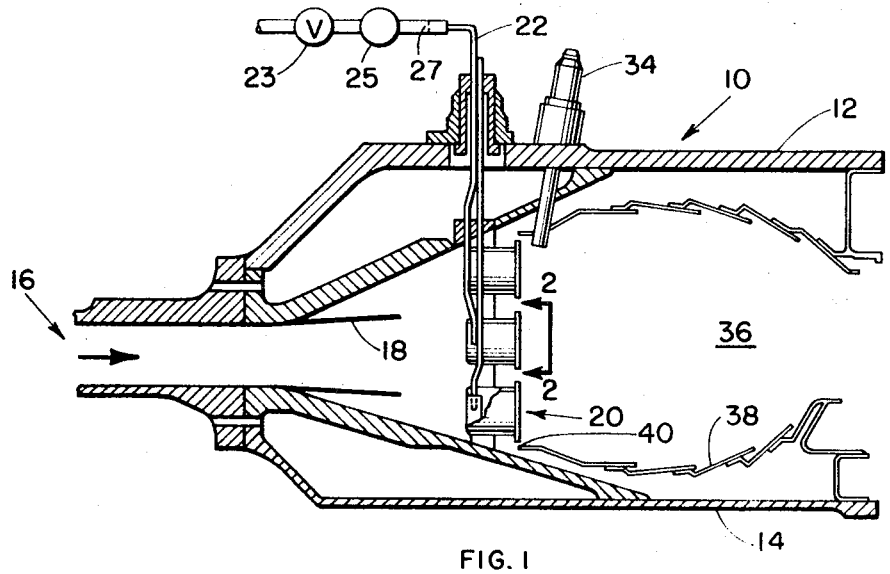
FIG. 1 is a sectional view of a high temperature combustor constructed in accordance with the present invention.

Referring now to the drawings there is shown in FIG. 1 a combustor 10 used with a gas turbine engine having a compressor and a turbine mounted on a spindle. The combustor 10 is positioned between the compressor and the turbine so that air from the compressor is heated in the combustor and directed through the turbine in a manner well known in the art. A prior art combustor in a gas turbine engine is shown in U.S. Pat. No. 3,581,492.

The combustor 10 has an outer wall 12 spaced from an inner wall 14. Both the walls 12 and 14 encircle the gas turbine engine spindle. Air from the compressor is supplied to the space between the walls 12 and 14 through an inlet air duct 16. This air moves past diffuser inserts 18 positioned in the end of the duct 16.

According to the present invention a plurality of swirl can modules 20 are mounted in the combustor 10 as shown in FIG. 1. By way of example, 120 swirl can modules 20 were mounted in three consecutive circles in a 42 inch diameter combustor. Lines 22 from a suitable supply of liquid fuel are connected to the swirl can modules. Valves 23 control the flow of fuel to manifolds 25 which are connected through choke orifices 27 to the lines 22. Three manifolds 25 were utilized in the aforementioned 42 inch diameter combustor. One manifold was connected to the swirl can modules 20 in each of the three consecutive circles. Thus fuel is injected at 120 locations in the aforementioned combustor compared to approximately 30 for a conventional combustor.

Figure 3:
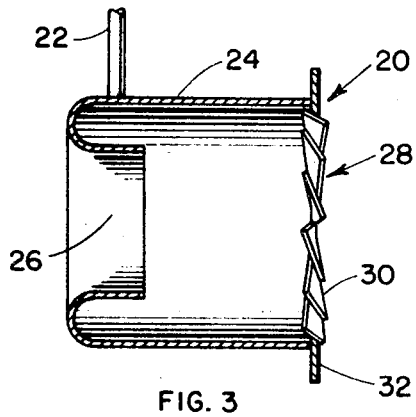
FIG. 3 is a sectional view taken along the line 3—3 in FIG. 2.
Figure 2:
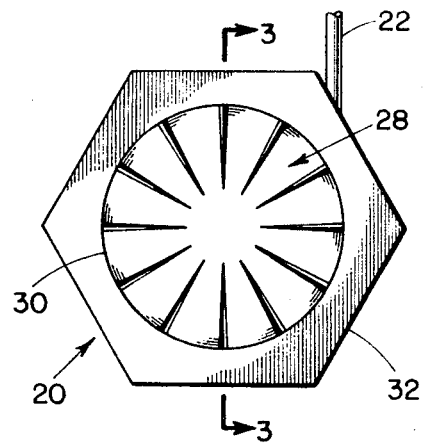
FIG. 2 is an enlarged end view of a swirl can module taken along the line 2—2 in FIG. 1.

Referring now to FIGS. 2 and 3 each swirl can module 20 has a hollow cylindrical housing 24 which serves as a carburetor. The end of the can facing the air duct 16 is open at inlet 26 as shown in FIG. 3 to enable combustion air to enter the can. Fuel enters the can adjacent to the inlet 26 from the fuel line 22 in a tangential manner.

A swirl plate 28 is mounted on the opposite end of the can housing 24 from the inlet opening 26. The swirl plate 28 has a number of vanes 30 which are angularly disposed relative to the exit plane of the can. An angle between 10° and 35° has been satisfactory for the vanes 30 in the swirl plate 28.

A flame stabilizer plate 32 having a hexagonal periphery encircles the swirl plate 28. This flat plate flame stabilizer 32 is likewise mounted on the end of the can 24.

In operation, combustion air enters the can housing 24 through the inlet 26 where it is mixed with fuel from the line 22. The fuel-air mixture then passes through the swirl plate 28 and is ignited downstream of the flat plate stabilizer 30 by a suitable igniter 34. The fuel-air mixture burns in a combustion chamber 36 formed by a film cooled liner 38. Nozzle fouling problems are minimized because the fuel orifices in the lines 22 are outside of the hot zone.

Secondary combustion air flows axially past the swirl can module 20 into the combustion chamber 36 where it recirculates in the wakes of the modules and completes the combustion reaction. Because of the large circumference of the stabilizer plate 32 the interfaced mixing area between the bypass air and the hot gases in the wake of each module is increased to its maximum value. The housing 24 of each module 20 does not extend into the burning zone within the combustion chamber 36. The mixing of diluent air and combustion products occurs because of recirculation and eddy currents. The liner 38 has nearly all its metal surfaces displaced from the flame streamline thereby reducing the liner coolant flow required. A plurality of air entry slots 40 are provided on the leading edge of the liner 38 to supply air to the hottest zones in the combustion chamber 36. This air is not used entirely for cooling because the entry slots are upstream and the air can be used to combine with fuel.

The length of the combustor 10 is much less that that of a conventional combustor. By way of example the aforementioned 42 inch diameter combustor had an overall length of 20 ¼ inches. The length of the combustor was only 11 ½ inches from the plane of fuel entry. With such a short length very little air is required for cooling the liners 38 and essentially all of the combustion air passes through the array of swirl can modules.

The flow of fuel can be easily controlled into each module 20 by adjusting the valves 23 and the orifices 27. Varying amounts of fuel can be supplied to each module 20 to compensate for nonuniformity of air flow profiles. Also, it is not necessary to utilize all modules at all burning conditions. Under certain conditions, such as during engine idle, one row of modules can be ignited and good performance can be maintained at off design conditions.

While a preferred embodiment of the invention has been described it will be appreciated that various structural modifications can be made without departing from the spirit of the invention or the scope of the subjoined claims. For example, although the flame stabilizer 32 is flat and has a hexagonal periphery other configurations have been utilized. Flame stabilizers in the form of cones have been used. Also the stabilizer may be in the form of a star.

What is claimed is:

1. A combustor for a high performance gas turbine engine comprising
   a pair of spaced walls forming a full annulus,
   a duct for supplying compressed air to an annular space between said spaced walls,
   a plurality of spaced modules mounted in said annular space adjacent to said duct whereby said compressed air is directed toward said modules so that a first portion of said compressed air passes through said modules and a second portion passes around said modules in the space therebetween, each of said modules comprising
   a hollow cylindrical housing having an open end for receiving said first portion of said compressed air forming primary combustion air,
   means for injecting fuel tangentially into said housing to provide a mixture of air and fuel, and
   a plurality of vanes at one end of said housing opposite said open end for swirling said mixture of air and fuel prior to mixing with secondary air, said secondary air comprising said second portion of said compressed air that flows around said modules, said first and said second portions comprising substantially the entire amount of said compressed air supplied from said duct,
   a film cooled liner on the oposite side of said modules from said duct forming a combustion chamber for receiving said mixture of air and fuel and said secondary combustion air, and
   means for igniting said mixture of air and fuel in said combustion chamber.

2. A combustor as claimed in claim 1 including means for separately controlling the flow of fuel to certain of said modules whereby said modules are selectively ignited thereby enabling said engine to be operated at off design conditions.

3. A combustor as claimed in claim 1 including means for stabilizing combustion flame adjacent said vanes.

4. A combustor as claimed in claim 3 wherein the means for stabilizing combustion flame comprises a substantially flat plate extending outward from said vanes.

* * * * *